(12) United States Patent
Park et al.

(10) Patent No.: US 8,039,135 B2
(45) Date of Patent: Oct. 18, 2011

(54) ELECTROCHEMICAL CELL EXHIBITING ENHANCED SAFETY FEATURES

(75) Inventors: Young-Sun Park, Daejeon (KR); Myoung-Hun Lee, Seoul (KR); Pil-Kyu Park, Daejeon (KR); Eun-Ju Kang, Daejeon (KR)

(73) Assignee: LG Chem, Ltd. (KR)

( * ) Notice: Subject to any disclaimer, the term of this patent is extended or adjusted under 35 U.S.C. 154(b) by 67 days.

(21) Appl. No.: 12/446,627

(22) PCT Filed: Oct. 22, 2007

(86) PCT No.: PCT/KR2007/005184
§ 371 (c)(1),
(2), (4) Date: Apr. 22, 2009

(87) PCT Pub. No.: WO2008/050981
PCT Pub. Date: May 2, 2008

(65) Prior Publication Data
US 2010/0021801 A1    Jan. 28, 2010

(30) Foreign Application Priority Data
Oct. 23, 2006    (KR) .................. 10-2006-0103087

(51) Int. Cl.
*H01M 2/12* (2006.01)
*H01M 2/14* (2006.01)
*H01M 10/02* (2006.01)
*H01M 4/02* (2006.01)
*H01M 10/52* (2006.01)
*H01M 2/34* (2006.01)

(52) U.S. Cl. ............ 429/53; 429/61; 429/164; 429/211; 429/246; 429/57; 429/94

(58) Field of Classification Search .................... 429/53, 429/209, 246, 61, 74, 94, 164, 245, 163, 429/211, 176
See application file for complete search history.

(56) References Cited

U.S. PATENT DOCUMENTS
2,282,760 A * 5/1942 Hauel .......................... 429/245
(Continued)

FOREIGN PATENT DOCUMENTS
JP    07254402 A  * 10/1995
(Continued)

OTHER PUBLICATIONS
Abstract of JP 07254402 A, Hanabusa et al., Oct. 1995.*
(Continued)

*Primary Examiner* — Jonathan Crepeau
*Assistant Examiner* — Kenneth Douyette
(74) *Attorney, Agent, or Firm* — Lerner, David, Littenberg, Krumholz & Mentlik, LLP

(57) ABSTRACT

Disclosed is the structure of a center pin assembly inserted into the winding center of a winding-type electrode assembly of an electrochemical device, which has a case containing the winding-type electrode assembly. The center pin assembly can secure the safety of an electrochemical device when physical impact (e.g. squeezing, shock) is applied from the outside, when the internal temperature rises, and/or when the device is overcharged. The center pin assembly includes a center pin manufactured by winding a planar substrate into a tubular shape, the planar substrate having at least two protrusions formed in an embossing type or at least two discontinuous scores formed in a predetermined shape; and a container placed in a space inside the center pin, the container containing a substance capable of improving the safety of the device.

31 Claims, 4 Drawing Sheets

U.S. PATENT DOCUMENTS

| | | | |
|---|---|---|---|
| 6,063,518 A * | 5/2000 | Dewulf et al. | 429/53 |
| 6,207,321 B1 * | 3/2001 | Fukagawa et al. | 429/176 |
| 2004/0258987 A1 * | 12/2004 | Shin | 429/163 |
| 2005/0008930 A1 * | 1/2005 | Johnson et al. | 429/94 |
| 2006/0263676 A1 * | 11/2006 | Chang et al. | 429/74 |
| 2007/0269711 A1 * | 11/2007 | Meguro et al. | 429/94 |

FOREIGN PATENT DOCUMENTS

| | | |
|---|---|---|
| JP | 08250155 | 9/1996 |
| JP | 08255631 | 10/1996 |
| JP | 08264206 | 10/1996 |
| JP | 11067263 | 3/1999 |
| JP | 11-204140 A | 7/1999 |
| KR | 1020040110600 | 12/2004 |
| KR | 2006/104333 | * 10/2006 |
| WO | WO 2006/049167 | * 10/2006 |

OTHER PUBLICATIONS

International Search Report, PCT/KR2007/005184.

* cited by examiner

CENTER PIN   CONTAINER CONTAINING SPECIFIC SUBSTANCE

ELECTROCHEMICAL CELL EXHIBITING ENHANCED SAFETY FEATURES

CROSS REFERENCE TO RELATED APPLICATIONS

The present application is a national phase entry under 35 U.S.C. §371 of International Application No. PCT/KR2007/005184, filed Oct. 22, 2007, published in English, which claims the benefit of Korean Patent Application No. 10-2006-0103087, filed Oct. 23, 2006. The disclosures of said applications are incorporated by reference herein.

BACKGROUND OF THE INVENTION

1. Field of the Invention

The present invention relates to the structure of a center pin assembly inserted into the winding center of a winding-type electrode assembly of an electrochemical device, which has a case containing the winding-type electrode assembly, and more particularly to a center pin assembly adapted to secure the safety of an electrochemical device when physical impact (e.g. squeezing, shock) is applied from the outside, when the internal temperature rises, and/or when the device is overcharged.

2. Description of the Prior Art

As generally known in the art, lithium secondary batteries with high energy density have been extensively developed in line with the recent trend towards compact and light electronic equipment, as well as the widespread use of portable electronic devices.

Lithium secondary batteries use substances that are adapted to intercalate and deintercalate lithium ions as their cathode and anode, respectively, and an organic electrolyte or a polymer electrolyte fills the space between the cathode and anode. The Lithium secondary batteries create electric energy based on the oxidation and reduction reactions occurring when lithium ions are intercalated to and deintercalted from the cathode and anode, respectively.

However, lithium secondary batteries have a safety problem, and various efforts have been made to solve it.

If a lithium secondary battery is overcharged, an excessive amount of lithium is deintercalated from the cathode and is intercalated to the anode. As a result, lithium metal with very high reactivity precipitates on the anode surface. The cathode also becomes thermally unstable. The organic solvent used as the electrolyte undergoes a decomposition reaction, and the resulting abrupt exothermic reaction causes the battery to catch fire or explode.

In addition, lithium secondary batteries using a flammable non-aqueous electrolyte generally explode or catch fire due to a flammable gas resulting from the decomposition reaction of the electrolyte when the internal temperature of the batteries rises, due to a flammable gas resulting from the reaction between the electrolyte and the electrodes, or due to oxygen created as a result of decomposition of the cathode.

Furthermore, if a battery is crushed by a heavy object, if strong impact acts on the battery, or if the battery is exposed to a high temperature, the safety problem occurs. Particularly, the cathode and anode inside the battery are locally short-circuited if a nail penetrates the battery, if the battery is squeezed, if impact is applied to the battery, or if the battery is exposed to a high temperature. As a result, an excessive amount of current locally flows and generates heat. The amount of short-circuit current resulting from the local short circuit is inversely proportional to the resistance, and a larger amount of short-circuit current flows toward portions with low resistance. In this case, a very large amount of heat is locally generated around the short-circuited portion.

If heat is generated inside a battery, the cathode, anode, and electrolyte, which constitute the interior of the battery, react with one another or burn. This reaction is highly exothermic, and the battery finally catches fire or explodes. Therefore, such abrupt heat generation inside the battery must be avoided.

In an attempt to improve the safety in the case of overcharging, an additive is added to the non-aqueous electrolyte. However, the safety cannot be secured simply by adding an additive to the non-aqueous electrolyte when a nail penetrates the battery, when the battery is squeezed, when an impact acts on the battery, or when the battery is exposed to a high temperature, as mentioned above.

SUMMARY OF THE INVENTION

Accordingly, it is an object of the present invention to provide a center pin assembly adapted to perform various functions, particularly those related to the safety of an electrochemical device, in the limited space occupied by a center pin inserted into the winding center of a winding-type electrode assembly. More particularly, the object of the present invention is to provide a center pin assembly adapted to secure the safety of an electrochemical device when physical impact (e.g. squeezing, shock) is applied from the outside, when the internal temperature rises, and/or when the device is overcharged.

In order to achieve the above-mentioned object, the present invention provides a center pin assembly to be inserted into a winding center of an electrochemical device having a case containing a winding-type electrode assembly, the center pin assembly comprising: a center pin manufactured by winding a planar substrate into a tubular shape, the planar substrate having at least two protrusions formed in an embossing type or at least two discontinuous scores formed in a predetermined shape; and a container placed in a space inside the center pin, the container containing a substance capable of improving safety of the device.

Also, the present invention provides an electrochemical device comprising: a winding-type electrode assembly obtained by stacking and winding a first separation film, a first electrode plate having a first electrode tab, a second separation film and a second electrode plate having a second electrode tab; a case containing the winding-type electrode assembly; and the above-mentioned center pin assembly inserted into a winding center of the winding-type electrode assembly.

DETAILED DESCRIPTION OF THE EXEMPLARY EMBODIMENTS

Hereinafter, the present invention will be explained in more detail.

A center pin assembly according to the present invention is inserted into the winding center of an electrochemical device, which has a case containing a winding-type electrode assembly.

A winding-type electrode assembly using a center pin assembly according to the present invention includes a first separation film, a first electrode plate having a first electrode tab, a second separation film, and a second electrode plate having a second electrode tab. The center pin assembly is adjacent to the first separation film, which has been wound, and is electrically insulated from the first electrode plate by the first separation film.

Figure 1:
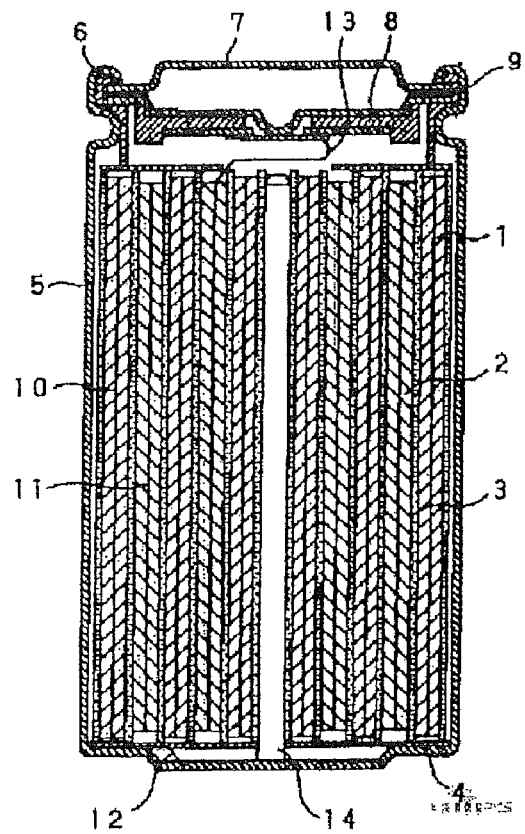
FIG. 1 shows an electrochemical device having an electrode assembly wound by a center pin according to the prior art.

The winding-type electrode assembly is contained in a case, the example of which is an assembly including a can and a cap for sealing the cap. The can is made of an electrically conductive material, and may act as a second electrode terminal electrically connected to the second electrode tab (refer to FIG. 1).

The center pin assembly according to the present invention is adapted to perform various functions, particularly those related to the safety of the electrochemical device, in the limited space occupied by the center pin inserted into the winding center of the winding-type electrode assembly. The center pin assembly characteristically includes:

(a) a center pin manufactured by winding a planar substrate, which has at least two protrusions formed in an embossing type or which has at least two discontinuous scores formed in a predetermined shape, into a tubular shape; and (b) a container positioned in a space inside the center pin, the container containing a substance capable of improving the safety of the device.

(1) Center Pin Structure

Figure 2:
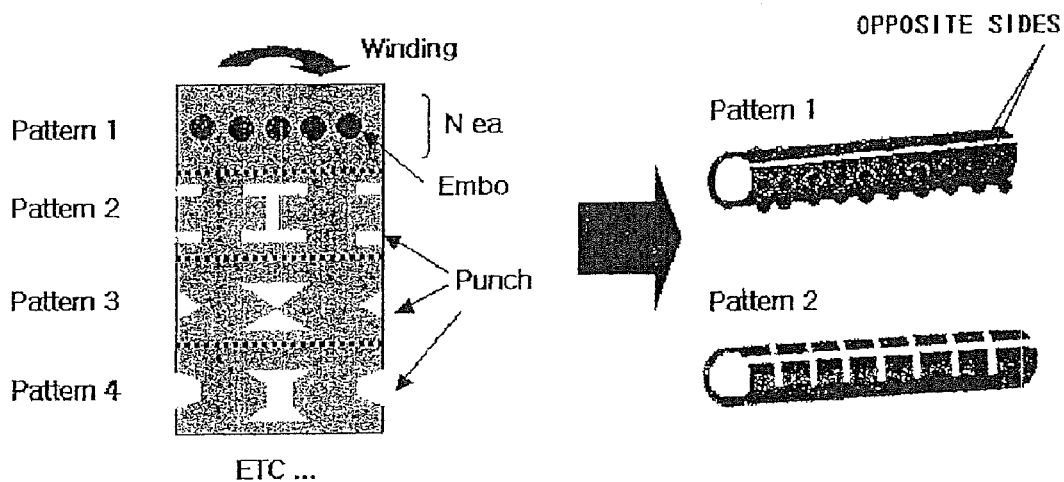
FIG. 2 briefly shows a process for manufacturing a center pin according to the present invention.

The center pin according to the present invention is manufactured by winding a planar substrate, which has at least two protrusions formed in an embossing type or which has at least two discontinuous scores formed in a predetermined shape, into a tubular shape through a simple manufacturing process so that a hollow tube is formed (refer to FIG. 2). The center pin can secure the safety of the electrochemical device when physical impact (e.g. squeezing, shock) is applied from the outside, as will be described later.

The planar substrate having at least two protrusions formed in an embossing type can be manufactured by processing a planar substrate with various embossing machines (e.g. embossing stampers).

Figure 3:
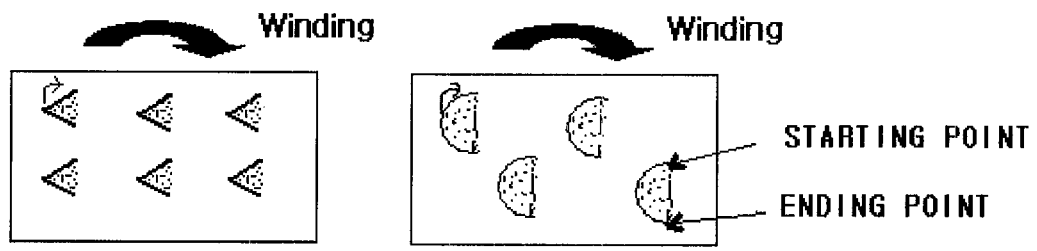
FIG. 3 shows exemplary planar substrates having at least two discontinuous scores formed in a predetermined shape.
Figure 4:
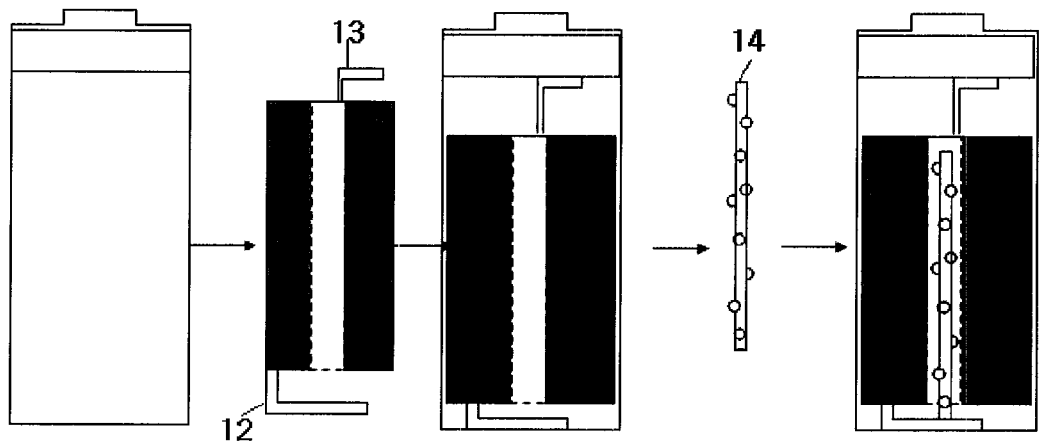
FIG. 4 shows how to assemble a battery by using a center pin assembly according to an embodiment of the present invention.

By winding a planar substrate into a tubular shape (i.e. cylindrical shape), protrusions can be formed on a portion of the planar substrate, which lies on the score boundary portion (refer to FIGS. 2 and 3).

Protrusions resulting from scores may be obtained by forming scores on the planar substrate and stamping it so that protrusions are formed on a portion of the substrate, which lies on the score boundary portion. For example, a planar substrate having scores formed thereon is placed into a stamper, extruded, and heat-treated so that protrusions are formed before winding the planar substrate.

The scores may be formed by a punch. FIGS. 2 and 3 show exemplary planar substrates having at least two discontinuous scores formed in a predetermined shape.

The starting and ending points of a score may coincide with each other so that a closed loop is established. Alternatively, the starting and ending points may not coincide with each other so that an open loop is established. Each score may be a combination of at least two straight lines, a single curved line, a combination of at least two curved lines, or a combination of straight and curved lines. As such, the scores and the protrusions can come in various shapes.

The planar substrate or the center pin may be made of stainless steel, titanium, nickel, or aluminum, but the material is not limited to that. The planar substrate or the center pin is preferably made of an electrically conductive material.

The planar substrate may have a thickness of 0.1-1 mm depending on the size of the electrochemical device. The thickness is preferably 0.1-0.4 mm.

The diameter of the center pin is determined in conformity with the size of the mandrel of the electrochemical device, but should not be too large. For example, the center pin may have an inner diameter of 1.5-6 mm, preferably 3-4 mm. The protrusions on the center pin may have a height of 0.1-2 mm, preferably 0.2-0.6 mm.

The degree of sharpness and/or the strength of the protrusions may be adjusted so that the limit of internal or external pressure, which can fracture the separation films, the electrodes, etc., can be adjusted.

Preferably, the protrusions are evenly distributed on the entire surface of the center pin in consideration of safety.

The embossing-type protrusions or protrusions formed by scores may be formed on the inner peripheral surface of the hollow tube-type center pin, on its outer peripheral surface, or on both inner and outer peripheral surfaces thereof.

If the embossing-type protrusions or protrusions formed by scores are formed on the outer peripheral surface of the center pin, the following advantages can be expected:

If physical impact is applied to the battery from the outside, the separation film inside the battery, which prevent the cathode and anode from contacting each other, is torn off, and a short circuit occurs. If a minute short circuit occurs, the high energy of the battery is concentrated in the minute region that has been short-circuited. The excessive current generates heat, which is concentrated in the minute region, and the resulting instantaneous thermal runaway may cause the battery to catch fire or explode.

Therefore, the center pin having embossing-type protrusions or protrusions formed by scores according to the present invention intentionally create a number of short circuits when impact is applied from the outside, so that the short-circuit current is distributed over a number of short-circuited regions. This preferably distributes the created current and/or heat to the center pin so that the battery is not endangered by thermal runaway.

It is to be noted that the center pin according to the present invention retains the embossing-type protrusions or the protrusions formed by scores even in a normal condition so that a number of short circuits can be intentionally induced by the protrusions, even if the center pin has not been deformed or before the center pin is deformed. This reliably prevents an emergent situation of the battery (e.g. thermal runaway) resulting from concentration and accumulation of energy.

In order to intentionally create a number of short circuits by the embossing-type protrusions or the protrusions crated by scores, the protrusions must be adapted to fracture the separation film adjacent to the center pin, or to fracture the first separation film, the second electrode plate, and the second separation film.

In order to ensure that short circuits are created simply by fracturing the separation film, the center pin must be made of an electrically conductive material and electrically connected to the second electrode tab of the second electrode plate. In a normal condition, the center pin must be insulated form the first electrode plate by the first separation film.

It is to be noted that, when the first separation film, the second electrode plate, and the second separation film must be fractured to intentionally create short circuits, the center pin is electrically insulated from the electrode terminals.

When a planar substrate is wound into a tubular shape to form a hollow tube, the two opposite sides of the wound planar substrate, which are adjacent to each other in the axial direction, preferably contact each other without overlapping each other, or they are preferably spaced from each other. The edges of the opposite sides are positioned so that they are exposed neither to the outside nor to the inside in a normal condition.

When pressure of a predetermined level or higher is applied from the outside, the opposite sides crisscross each other, or their edges protrude toward the inside or outside so that the adjacent member(s), e.g. the separation films, the electrode plates, the container inside the center pin, etc., can be axially fractured along a straight line so as to correspond to respective sides.

Besides the fact that, when external impact is applied, the protrusions near the impacted local region can additionally create intentional local short circuits, the edges of the opposite sides can also create intentional short circuits over the entire axial surface, even if the external impact is local, because the entire axial region is fractured by the edges of the opposite sides. In addition, even if no protrusions can be formed on both ends of the electrochemical device in the axial direction of the center pin due to processing-related limitations, the edges of the opposite sides of the planar substrate can create intentional short circuits when external impact is applied to both ends of the electrochemical device.

Figure 5:
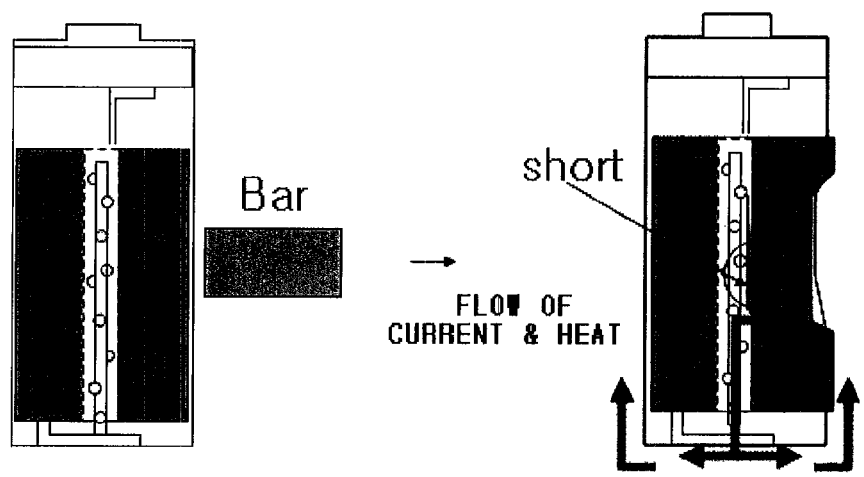
FIG. 5 briefly shows how safety is ensured by a center pin assembly according to an embodiment of the present invention.

Referring to FIG. 5, a center pin 14 having at least one protrusion formed on its surface so that the separation film can be fractured when pressure of a predetermined level or higher is applied from the outside, according to an embodiment of the present invention, is electrically connected to a second electrode tab 12 made of an electrically conductive material and provided on the second electrode plate, or to a second electrode terminal 5 electrically connected to the second electrode tab. In a normal condition, the center pin is electrically connected to the second electrode plate and is electrically insulated from the first electrode plate by the first separation film. If pressure of a predetermined level or higher is applied from the outside, the first separation film is fractured by the protrusions and/or the edges of the opposite sides in at least one region so that the center pin and the first electrode plate are intentionally short-circuited. As a result, the short-circuit current is distributed over a number of short-circuited regions and is also distributed to the battery can 5 via the center pin. This prevents the battery from being endangered by thermal runaway (refer to FIG. 5).

The center pin and/or the can are preferably made of a thermally conductive material so that heat resulting from short circuits can be distributed to the center pin and/or the can (refer to FIG. 5).

(2) Construction of a Container Having a Space Inside the Center Pin

The present invention is characterized in that a sealed container is placed in a space inside the center pin, and the container contains a substance capable of improving the safety of the electrochemical device.

In addition, the sealed container is characterized in that, if physical impact is applied from the outside, if the electrochemical device has an abnormally high temperature, and/of if the device is overcharged, a predetermined portion of the container is opened to discharge the safety-improving substance out of the container, and the electrochemical reaction of the discharged substance improves the safety of the electrochemical device.

Particularly, a predetermined portion of the container is opened only when the temperature of the electrochemical device rises abnormally and/or when the device is overcharged, so that the substance capable of improving the safety of the electrochemical device does not affect the device when the temperature and voltage inside the device are in a normal range, but the substance is discharged to solve the safety problem of the device only when the device has an abnormally high temperature or when the device is overcharged.

When the center pin assembly according to the present invention is employed, the protrusions on the inner peripheral surface of the center pin and/or the edges of the two opposite sides of the center pin may fracture the container or facilitate its fracture when pressure of a predetermined level or higher is applied from the outside. As a result, the substance capable of improving the safety of the device is discharged from the container to the outside of the center pin and improves the safety of the device.

Non-limiting examples of the substance capable of improving the safety of the device include a group of substances capable of forming a coat on the electrode surface by polymerization, such as cyclohexylbenzene and biphenyl; a group of catalyst substances that initiate polymerization; a group of substances for an oxidation-reduction shuttle reaction, such as chloroanisole; a group of nonflammable substances, such as phosphoric acid derivatives and ether fluoride; a group of substances capable of creating gas when thermally decomposed, such as azo compounds and peroxide compounds; and a group of ionic salts that can cause oxidation and reduction reactions at the electrodes. These substances may be used alone, or at least two of them may be mixed and used.

Meanwhile, the prior art has difficulty in activating a safety device, such as a CID (Current Interrupt Device) or a vent, at a desired time even if it has been properly installed. The CID is designed to activate at 3-8 $kg/cm^3$, and the vent at 12 $kg/cm^3$. The activation of such a safety device needs the increase of pressure inside the battery, which requires that a flammable gas created by decomposition of the electrolyte at a high temperature or voltage, or oxygen created by decomposition of the cathode substance expand by means of the rising temperature. If the pressure inside the batter is still low even if a flammable gas and oxygen are created, the CID or vent is not activated although combustible environments gradually develop inside the battery. The accumulated flammable gas finally catches fire and explodes. The activating pressure of the CID or vent may be lowered in an attempt to improve the situation. However, this has another problem in that the CID or vent may be activated by the increase of internal pressure, which may occur during normal operations of the battery, and the battery becomes unusable.

In order to solve these problems, the present invention may use a gas or a gas-creating substance as the substance capable of improving the safety of the device. The container is adapted to be fractured under a specific condition only and emit a large amount of gas so that the pressure inside the electrochemical device rises. This results in early activation of a safety means, which senses the change of pressure inside the device and activates itself, such as (i) a first safety means for stopping the device from activating any more and/or (ii) a second safety means for turning the abnormal condition inside the device into a normal one. As a result, the oxygen or flammable gas, which is necessary to catch fire, the electrolyte, and the internally accumulated heat are discharged to the outside beforehand so that the density of the flammable gas and the temperature inside the device drop. This prevents fire and explosion and improves the safety of the battery.

The first safety means may be a pressure-sensitive device, such as a CID. The first safety means may include (i) a pressure-sensitive device; (ii) a wire for transmitting a current from the pressure-sensitive device; and (iii) a member adapted to respond to the current transmitted via the wire and stop the device charging process or switch the charging process to a discharging process. The second safety means may be a pressure-opened valve, such as a vent.

Non-limiting examples of the gas or gas created by the gas-creating compound include inert gases such as $N_2$, He, Ne, Ar, Kr, and Xe; extinguishing gases such as $CO_2$, $F_2$, and $Br_2$; and a mixture thereof. If possible, oxygen is excluded because it sets fire, and an inert gas is preferred because it has little connection with combustion.

The gas-creating compound may exist as a solid or a liquid, and, if the temperature reaches a threshold, a portion of the solid or liquid may undergo a phase change into gas partially or entirely. The compound may exist in a gaseous phase. The compound may be a substance that creates gas when thermally decomposed, a cryogenic liquid, a sublimable substance, or an ionic salt.

If the substance capable of improving the safety of the device is a substance that creates gas when thermally decomposed, the substance is discharged out of the container and thermally decomposed to create gas. Alternatively, the substance is thermally decomposed to create gas, and is discharged out of the container. The gas created outside the container or the gas discharged out of the container (carbon dioxide and/or nitrogen) can improve the safety of the device by cooperating with the safety means that senses the change of pressure inside the device and activates itself. The gas created by thermal decomposition may be a large amount of inert gas, and prevents the substance inside the device, which may generate heat, from contacting oxygen. This improves the safety of the device.

The substance that creates gas when thermally decomposed is a material decomposed in itself by heat to generate gases such as carbon dioxide or nitrogen. Non-limiting examples of the substance include organic peroxides, carbonate compounds, azo compounds, hydrazide compounds, carbazide compounds, or the like. Such compounds may be used alone or in combination in the container according to the present invention.

Further, the substance capable of improving the safety of the device may be a cryogenic liquid, a sublimable substance, or a mixture thereof.

If the substance discharged out of the container is a cryogenic liquid, the heat exchange between the cryogenic liquid and the substance inside the device rapidly decreases the temperature of the device and ensures the safety of the device. The cryogenic liquid or the sublimable substance may undergo a phase change into gas, and the absorption of heat from the surroundings during the phase change process contributes to the safety of the device. Further, the gas created as a result of the phase change may be a large amount of inert gas, which prevents the substance inside the device, which may generate heat, from contacting oxygen. This improves the safety of the device.

Non-limiting examples of the cryogenic liquid include liquid nitrogen, liquid helium, liquid neon, liquid argon, liquid carbon dioxide, chlorofluorocarbon (CFC) and hydrochlorofluorocarbon (HCFC), which are used as refrigerants, hydrofluorocarbon (HFC) and hydrocarbon (HC), which are alternative refrigerants. The cryogenic liquids may be used alone, or at least two of them may be mixed and used.

Non-limiting examples of the sublimable substance include iodine, naphthalene, camphor, dry ice, and Freon. These sublimable substances may be used alone, or at least two of them may be mixed and used.

An ionic salt may be used as the substance capable of improving the safety of the device. The cations and anions of the ion salt discharged out of the container move to the anode and cathode inside the device and undergo reduction and oxidation reactions, respectively. Particularly, the cations of the ionic salt react with electrons, which are highly accumulated by short circuits or overcharging resulting from external impact or internal problems, at the anode and reduce the number of electrons. This prevents the temperature from rising due to the abrupt flow of current. The anions of the ionic salt create nonflammable gas at the cathode and establish a nonflammable atmosphere inside the device. This improves the safety of the device.

For example, if the ionic salt is NaCl, $Na^+$ of NaCl that is discharged out of the container moves to the anode, consumes electrons, reduces, and precipitates as metal (Na). On the other hand, $Cl^-$ moves to the cathode, oxidizes, and creates nonflammable $Cl_2$ gas. This improves the safety of the device.

Non-limiting examples of the ionic salt include $Al_2(SO_4)_3$, $Ca(OH)_2$, $Mg(NO_3)_2$, $PbI_2$, NaCl, $MgCl_2$, and $Al_2(OH)_3$. These ionic salts may be used alone, or at least two of them may be mixed and used.

Figure 6:
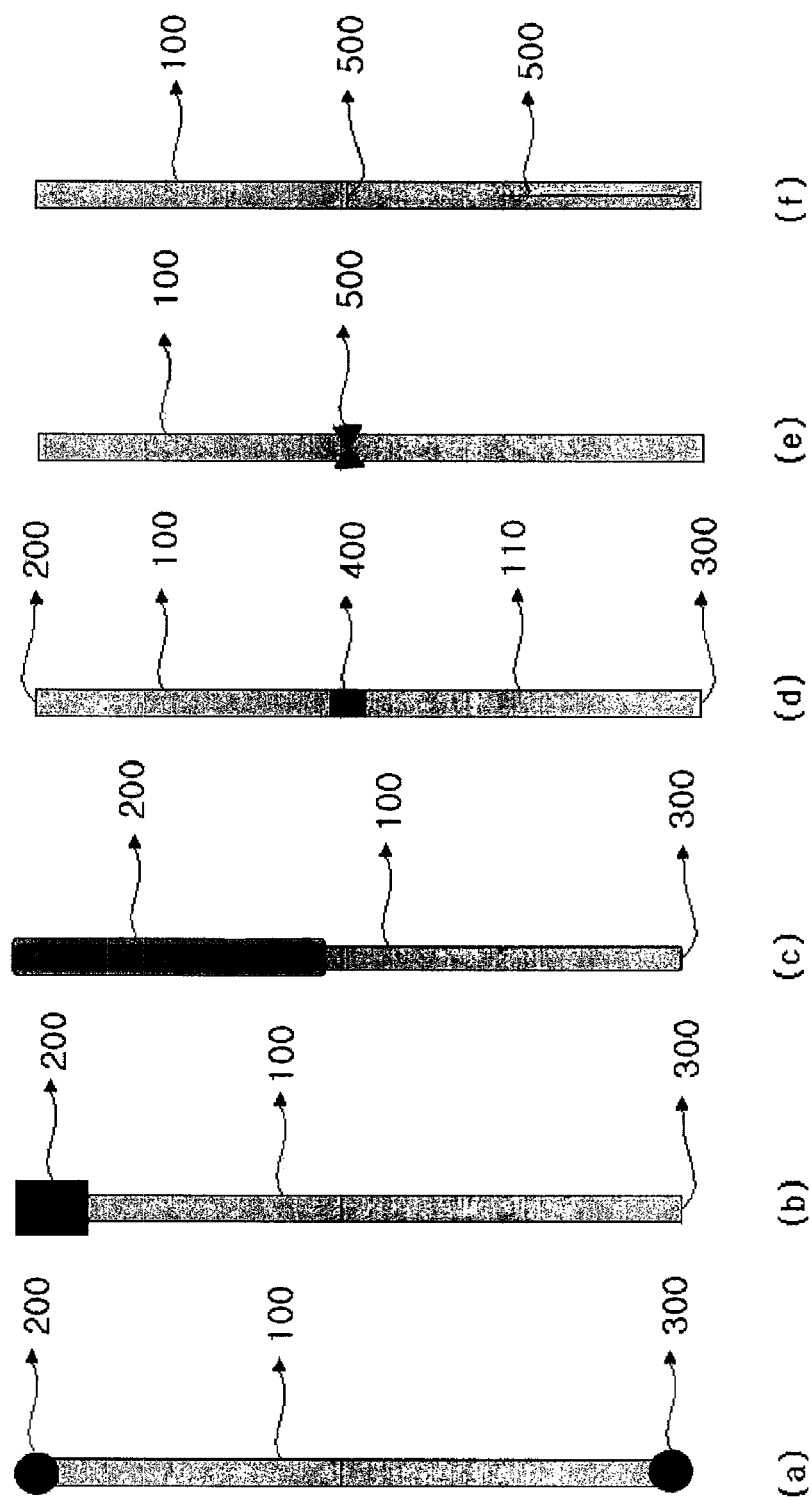
FIGS. 6a to 6f briefly show various exemplary containers according to the present invention.

FIG. 6 shows non-limiting examples of the container according to the present invention, which is adapted to open a predetermined portion and discharge the safety-improving substance out of the container when the electrochemical device has an abnormally high temperature and/or when the device is overcharged, and the examples can be classified into three types.

The first embodiment of the container according to the present invention comprises: a hollow cylindrical tube; a first member formed of a polymer and sealing one end of the hollow cylindrical tube; and a second member formed of a polymer or a metal and sealing the other end of the hollow cylindrical tube.

The first embodiment of the container is characterized in that either or both of the first member and the second member melt at a temperature higher than the normal drive temperature of the device or under a voltage higher than 4.3V. Herein, the temperature higher than the normal drive temperature preferably ranges from 70° C. to 200° C.

When either or both of the first member and the second member melt in the first embodiment of the container according the present invention, the inner part of the container can be exposed to the exterior.

There is no particular limitation in the polymer forming the first member and the second member, as long as the polymer melts at a temperature higher than the normal drive temperature of the device or under a voltage higher than 4.3V. Non-limiting examples of such polymers include silicone resins, acrylic resins, urethane resins, epoxy resins, rubber, polyethylene, polypropylene, polybutene, polyacetaldehyde, polyformaldehyde, polypropylene oxide, polymethyl methacrylate, polyvinylidene chloride, polyvinyl fluoride, polyvinylidene fluoride, or the like. The above polymers may be used alone or in combination. The polymer forming the first member and the polymer forming the second member may be the same or different.

Additionally, the hollow cylindrical tube may be formed of a polymer or metal. Particularly, the hollow cylindrical tube forms the skeleton of the container according to the present invention. The hollow cylindrical tube preferably has durability, electrochemical stability and thermal stability.

The polymer forming the hollow cylindrical tube may be the same as or different from the polymer forming the first member and the second member. Preferably, the polymer forming the hollow cylindrical tube has a higher melting point than the melting point of the polymer forming the first member and the second member. More preferably, the polymer forming the hollow cylindrical tube does not melt at a temperature higher than the normal drive temperature of the device or under a voltage higher than 4.3V but maintains its original shape. Non-limiting examples of such polymers include ethylene vinyl acetate (EVA), polystyrene, polyphenylene ether (PPE), polychlorotrifluoroethylene, polyvinyl chloride (PVC), polyethylene terephthalate (PET), polyamide, polycaprolactam, polycarbonate (PC), poly-(p-xylene), polyimide (PI), polyoxybenzoate (POB), polyetheretherketone (PEEK), polyphenylene sulfide (PPS), polyether sulfone (PES), polysulfone (PSU), silicone resins, acrylic resins, urethane resins, epoxy resins, rubber, polyethylene, polypropylene, polybutene, polyacetaldehyde, polyformaldehyde, polypropylene oxide, polymethyl methacrylate, polyvinylidene chloride, polyvinyl fluoride, polyvinylidene fluoride, or the like. The above polymers may be used alone or in combination.

Additionally, there is no particular limitation in the metal forming the hollow cylindrical tube and the second member, as long as the metal has a higher melting point than the melting point forming both the first member and the second member. Preferably, the metal does not melt at a temperature higher than the normal drive temperature of the device or under a voltage higher than 4.3V. Non-limiting examples of such metals include nickel, copper, aluminum, titanium, chrome, carbon, iron, cobalt, molybdenum, gold, silver, vanadium, SUS (stainless steel), alloys thereof, or the like. The above metals may be used alone or in combination.

FIG. 6a is a plan view showing the first embodiment of the container according to the present invention, which comprises a hollow cylindrical tube 100 and a first member 200 and a second member 300 sealing both ends of the hollow cylindrical tube. The polymer member and the end of the hollow cylindrical tube may be linked with each other, for example, by using a hot fusion process so that the end is sealed. Herein, the polymer member is introduced into the end of the hollow cylindrical tube after it is sealed. If the first member 200 and/or the second member 300 is formed of the same material as the hollow cylindrical tube 100, either end or both ends of the hollow cylindrical tube may be subjected to hot fusion to seal the container without using a separate first member and/or second member.

FIGS. 6b and 6c are plan views each showing another container according to the first embodiment of the present invention, comprising: a hollow cylindrical tube 100; a first member 200 formed of a polymer and sealing one end of the hollow cylindrical tube; and a second member 300 formed of a metal and sealing the other end of the hollow cylindrical tube. Herein, the first member formed of a polymer is introduced into one end of the hollow cylindrical tube in the form of a septum or capsule.

The second embodiment of the container according to the present invention comprises: a tube having two or more hollow cylindrical tubes connected to each other longitudinally by way of a polymer; a third member for sealing one end of the tube; and a fourth member for sealing the other end of the tube.

The second embodiment of the container is characterized in that the polymer for connecting the two or more hollow cylindrical tubes melts at a temperature higher than the normal drive temperature of the device or under a voltage higher than 4.3V, so that the connected tubes are separated from each other and the inner part of the sealed container is exposed to the exterior. Herein, the temperature higher than the normal drive temperature of the device preferably ranges from 70° C. to 200° C.

In the second embodiment of the container, the polymer for connecting the two or more hollow cylindrical tubes may be present in the form of a tube or plate. However, there is no particular limitation in the shape and thickness of the polymer.

Additionally, there is no particular limitation in the polymer for connecting the two or more hollow cylindrical tubes, as long as the polymer melts at a temperature higher than the normal drive temperature of the device using the container or under a voltage higher than 4.3V. Non-limiting examples of such polymers include silicone resins, acrylic resins, urethane resins, epoxy resins, rubber, polyethylene, polypropylene, polybutene, polyacetaldehyde, polyformaldehyde, polypropylene oxide, polymethyl methacrylate, polyvinylidene chloride, polyvinyl fluoride, polyvinylidene fluoride, or the like. The above polymers may be used alone or in combination.

In the second embodiment of the container, the hollow cylindrical tube, the third member and the fourth member may be formed of a polymer or metal independently from each other.

There is no particular limitation in the polymers forming the hollow cylindrical tube, the third member and the fourth member. Therefore, each of the polymers forming the hollow cylindrical tube, the third member and the fourth member may be the same as or different from the polymer for connecting the two or more hollow cylindrical tubes. Preferably, each polymer has a higher melting point than the melting point of the polymer for connecting the two or more hollow cylindrical tubes. More preferably, each polymer does not melt at a temperature higher than the normal drive temperature of the device or under a voltage higher than 4.3V but maintains its original shape. Non-limiting examples of such polymers are the same as the polymer forming the hollow cylindrical tube in the first embodiment of the container.

Additionally, there is no particular limitation in the metal forming the hollow cylindrical tube, the third member and the fourth member, as long as the metal has a higher melting point than the melting point of the polymer for connecting the two or more hollow cylindrical tubes. More preferably, the metal does not melt at a temperature higher than the normal drive temperature of the device or under a voltage higher than 4.3V. Non-limiting examples of such metals are the same as the metal forming the hollow cylindrical tube in the first embodiment of the container.

FIG. 6d is a plan view showing another container of the second embodiment according to the present invention, which comprises a tube having two hollow cylindrical tubes 100, 110 connected longitudinally to each other by way of a polymer 400, and a third member 200 and a fourth member 300 formed of a polymer and sealing both ends of the hollow cylindrical tube.

The third embodiment of the container according to the present invention comprises: a hollow cylindrical tube having at least one opening on a surface thereof and sealed at both ends thereof; and a polymer member for sealing the opening.

The third embodiment of the container is characterized in that the polymer member for sealing the opening melts at a temperature higher than the normal drive temperature of the device or under a voltage higher than 4.3V, so that the inner part of the sealed container is exposed to the exterior. Herein, the temperature higher than the normal drive temperature of the device preferably ranges from 70° C. to 200° C.

There is no particular limitation in the shape and size of the opening formed on the surface of the hollow cylindrical tube.

Also, there is no particular limitation in the shape and size of the polymer member for sealing the opening. For example, the polymer member 500 may have a notch-like shape indented into the hollow cylindrical tube 100 as shown in FIG. 6e, a scratch-like shape formed on the hollow cylindrical tube 100 as a thin layer as shown in FIG. 6f.

Additionally, there is no particular limitation in the polymer for the polymer member, as long as the polymer melts at a temperature higher than the normal drive temperature of the device using the container or under a voltage higher than 4.3V. Non-limiting examples of such polymers include silicone resins, acrylic resins, urethane resins, epoxy resins, rubber, polyethylene, polypropylene, polybutene, polyacetaldehyde, polyformaldehyde, polypropylene oxide, polymethyl methacrylate, polyvinylidene chloride, polyvinyl fluoride, polyvinylidene fluoride, or the like. The above polymers may be used alone or in combination.

In the third embodiment of the container, the hollow cylindrical tube may be formed of a polymer or metal.

There is no particular limitation in the polymer forming the hollow cylindrical tube. Therefore, the polymer forming the hollow cylindrical tube may be the same as or different from the polymer for the polymer member. Preferably, the polymer has a higher melting point than the melting point of the polymer member. More preferably, the polymer does not melt at a temperature higher than the normal drive temperature of the device or under a voltage higher than 4.3V but maintains its original shape. Non-limiting examples of such polymers are the same as the polymer forming the hollow cylindrical tube in the first embodiment of the container.

Additionally, there is no particular limitation in the metal forming the hollow cylindrical tube, as Long as the metal has a higher melting point than the melting point of the polymer for the polymer member. More preferably, the metal does not melt at a temperature higher than the normal drive temperature of the device or under a voltage higher than 4.3V. Non-limiting examples of such metals are the same as the metal forming the hollow cylindrical tube in the first embodiment of the container.

Meanwhile, the container according to the present invention is not limited to the above first through third embodiments of the container. Any combination of the above embodiments is also included in the scope of the present invention.

Figure 7:
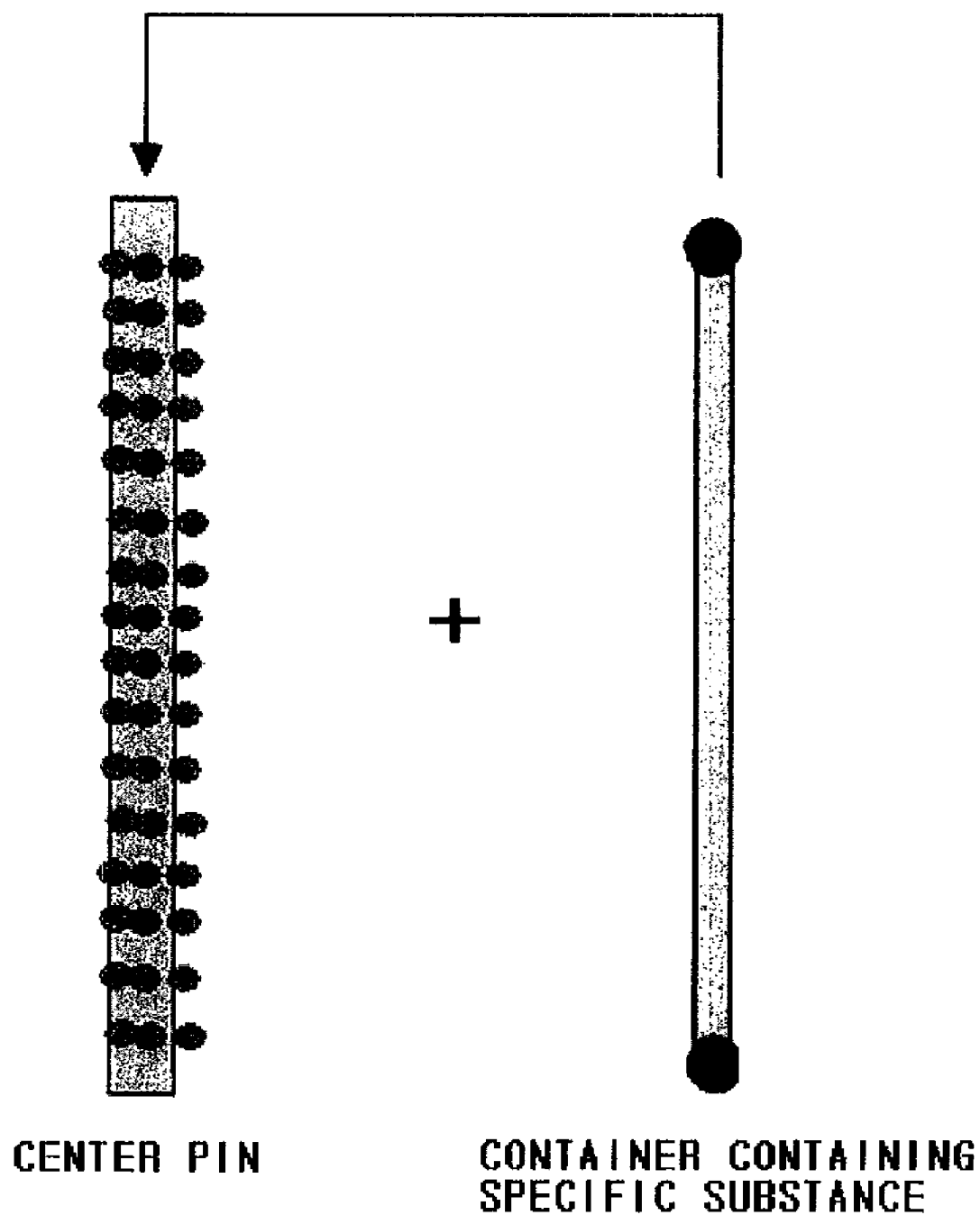
FIG. 7 shows how to assemble a center pin assembly by inserting a container into a center pin according to the present invention.

FIG. 7 shows how to assemble a center pin assembly by inserting the container into the center pin according to the present invention.

The present invention can employ the above-mentioned center pin assembly to improve the safety of every type of electrochemical devices adapted to undergo electrochemical reactions, including every type of primary batteries, secondary batteries, fuel cells, solar cells, capacitors. The secondary batteries preferably include lithium secondary batteries, such as lithium metal secondary batteries, lithium ion secondary batteries, lithium polymer secondary batteries, and lithium ion polymer secondary batteries. However, the present invention is applicable to every type of electrochemical devices including not only lithium ion batteries, but also nickel hydrogen batteries and nickel cadmium batteries. The present invention is also applicable to future batteries expected to replace lithium ion batteries.

There is no specific limitation on the shape of the electrochemical device used by the present invention, and the device can have various sizes and/or shapes including a cylinder type, a flat type, a bulk type, etc. The present invention is equally applicable to a pack case, a hard pack, and a soft pack.

The present invention provides an electrochemical device pack including a single electrochemical device, which is constructed as mentioned above, or a plurality of electrochemical devices combined based on parallel or serial connection.

Hereinafter, the present invention will be exemplified by a lithium secondary battery.

The lithium secondary battery includes a cathode comprising a lithium composite oxide as cathode active material, an anode capable of lithium intercalation/deintercalation, a non-aqueous electrolyte and a separation film.

As a cathode active material, the general cathode active material used in the conventional electrochemical devices may be used. Non-limiting example of the cathode active materials include: lithium transition metal composite oxides, such as $LiM_xO_y$ (M=Co, Ni, Mn, $Co_aNi_bMn_c$) (e.g. lithium manganese composite oxides such as $LiMn_2O_4$, lithium nickel oxides such as $LiNiO_2$, lithium cobalt oxides such as $LiCoO_2$, other oxides obtained by substituting manganese, nickel and cobalt in the above oxides partially with other transition metals, or lithium-containing vanadium oxide, etc.); or calcogenides, such as manganese dioxide, titanium disulfide, molybdenum disulfide, etc. Preferably, the cathode active material can be $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, $a+b+c=1$), $LiNi_{1-y}CO_yO_2$, $LiCo_{1-y}Mn_yO_2$, $LiNi_{1-y}Mn_yO_2$ (wherein, $0\leq Y<1$), $Li(Ni_aCo_bMn_c)O_4$ (wherein $0<a<2$, $0<b<2$, $0<c<2$, and $a+b+c=2$), $LiMn_{2-z}Ni_zO_4$, $LiMn_{2-z}Co_zO_4$ (wherein $0<Z<2$), $LiCoPO_4$, $LiFePO_4$ or the mixture thereof. More preferably, the cathode active material can be $Li_xMO_2$ (wherein, M is Ni, Co, or Mn, and $0.05\leq x\leq 1.10$).

The cathode active material is bonded to a cathode current collector such as foil formed of aluminum, nickel or combinations thereof to provide the cathode.

As an anode active material, the general anode active material used in the conventional electrochemical devices may be used. Non-limiting example of the anode active materials include lithium metal, lithium alloys, carbon, petroleum coke, activated carbon, graphite or other carbonaceous materials capable of lithium ion intercalation/deintercalation. The anode active material is bonded to an anode current collector such as foil formed of copper, gold, nickel, copper alloys or combinations thereof to provide the anode.

The separation film that may be used has a micro-porous structure and includes multilayer films formed of polyethylene, polypropylene or combinations thereof, or polymer films for solid polymer electrolytes or gel polymer electrolytes such as polyvinylidene fluoride, polyethylene oxide, polyacrylonitrile or polyvinylidene fluoride-hexafluoropropylene copolymer.

The electrolyte that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $ASF_6^-$, $CH_3CO_2^-$, $CF_3SO_3^-$, N(CF$_3$SO$_2$)$_2^-$, C(CF$_2$SO$_2$)$_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone and mixtures thereof.

As mentioned above, the center pin assembly according to the present invention has the following advantages: when pressure of a predetermined level or higher is applied from the outside, the protrusions formed on the surface of the center pin and/or the edges of the two opposite sides arranged along a straight line can create intentional short circuits. This prevents the electrochemical device from being endangered by thermal runaway and secures the safety of the device.

The container of the center pin assembly has a sealed structure having a space defined therein to contain a substance capable of improving the safety of the electrochemical device, and the amount of substance filling the space can be easily adjusted. The container storing the safety-improving substance according to the present invention does not affect the device when no physical impact is applied from the outside or when the temperature and voltage inside the device are in a normal range. A portion of the container, which is made of a polymer, melts and discharges the safety-improving substance from the space of the container to the outside when physical impact (e.g. squeezing, shock) is applied from the outside, when the device has an abnormally high internal temperature, or when the device has an excessive voltage resulting from overcharging. This improves the safety of the electrochemical device.

As such, the center pin assembly according to the present invention can exhibit various functions, particularly those related to the safety of the electrochemical device, in the limited space occupied by the center pin.

What is claimed is:

1. A center pin assembly to be inserted into a winding center of an electrochemical device having a case containing a winding-type electrode assembly, the center pin assembly comprising:
    a center pin manufactured by winding a planar substrate into a tubular shape, the planar substrate having at least two protrusions formed in an embossing type or formed by at least two discontinuous scores having a predetermined shape; and
    a container placed in a space inside the center pin, while being placed separately from the center pin, the container comprising one or more hollow cylindrical tubes containing a substance capable of improving safety of the device,
    wherein the at least two protrusions are formed on an outer peripheral surface of the center pin, and the protrusions are configured to fracture the winding-type electrode assembly so that at least one short circuit is created intentionally, when pressure of a predetermined level or higher is applied from an outside.

2. The center pin assembly as claimed in claim 1, wherein a portion of the planar substrate forms the at least two protrusions, the portion lying on a score boundary portion, when or before the planar substrate having the scores is wound into a tubular shape.

3. The center pin assembly as claimed in claim 1, wherein two opposite sides of the planar substrate wound into a tubular shape, the opposite sides facing each other in an axial direction, are adapted to contact each other without overlapping each other or to face each other while being spaced from each other.

4. The center pin assembly as claimed in claim 1, wherein edges of two opposite sides of the planar substrate wound into a tubular shape, the opposite sides facing each other in an axial direction, protrude when pressure of a predetermined level or higher is applied from an outside so that adjacent member(s) is fractured along a straight line so as to correspond to respective opposite sides.

5. The center pin assembly as claimed in claim 1, wherein the one or more hollow cylindrical tubes of the container has a structure comprising:
    a single hollow cylindrical tube;
    a first member formed of a polymer and sealing one end of the hollow cylindrical tube; and
    a second member formed of a polymer or a metal and sealing the other end of the hollow cylindrical tube.

6. The center pin assembly as claimed in claim 5, wherein either or both of the first member and the second member melt at a temperature higher than a normal drive temperature of the device or at a voltage higher than 4.3V.

7. The center pin assembly as claimed in claim 1, wherein the one or more hollow cylindrical tubes of the container has a structure comprising:
    two or more hollow cylindrical tubes connected to each other longitudinally by way of a polymer;
    a third member for sealing one end of the tube; and
    a fourth member for sealing the other end of the tube.

8. The center pin assembly as claimed in claim 7, wherein the polymer connecting the two or more hollow cylindrical tubes melts at a temperature higher than a normal drive temperature of the device or at a voltage higher than 4.3V.

9. The center pin assembly as claimed in claim 1, wherein the one or more hollow cylindrical tubes of the container has a structure comprising:
    a single hollow cylindrical tube having at least one opening on a surface thereof and sealed at both ends thereof; and
    a polymer member for sealing the opening.

10. The center pin assembly as claimed in claim 9, wherein the polymer member melts at a temperature higher than a normal drive temperature of the device or at a voltage higher than 4.3V.

11. The center pin assembly as claimed in claim 6, wherein the temperature higher than the normal drive temperature ranges from 70° C. to 200° C.

12. The center pin assembly as claimed in claim 5, wherein at least one of the polymer of the first member and the polymer of the second member is at least one polymer selected from the group consisting of silicone resins, acrylic resins, urethane resins, epoxy resins, rubber, polyethylene, polypropylene, polybutene, polyacetaldehyde, polyformaldehyde, polypropylene oxide, polymethyl methacrylate, polyvinylidene chloride, polyvinyl fluoride and polyvinylidene fluoride.

13. The center pin assembly as claimed in claim 1, wherein the substance capable of improving the safety of the device is a gas or a gas-creating compound.

14. The center pin assembly as claimed in claim 1, wherein the substance capable of improving the safety of the device is at least one ionic salt selected from the group consisting of Al$_2$(SO$_4$)$_3$, Ca (OH)$_2$, mg (NO$_3$)$_2$, PbI$_2$, NaCl, MgCl$_2$, and Al$_2$(OH)$_3$.

15. The center pin assembly as claimed in claim 1, wherein the substance capable of improving the safety of the device is a cryogenic liquid, a sublimable substance, or a mixture of the cryogenic liquid and the sublimable substance.

16. The center pin assembly as claimed in claim 1, wherein the at least two protrusions are formed on an inner peripheral surface of the center pin, on an outer peripheral surface of the center pin, or on both inner and outer peripheral surfaces of the center pin.

17. The center pin assembly as claimed in claim 1, wherein the at least two protrusions are evenly distributed on an entire surface of the planar substrate.

18. An electrochemical device comprising:
a winding-type electrode assembly obtained by stacking and winding a first separation film, a first electrode plate having a first electrode tab, a second separation film and a second electrode plate having a second electrode tab;
a case containing the winding-type electrode assembly; and
a center pin assembly according to claim 1 inserted into a winding center of the winding-type electrode assembly.

19. The electrochemical device as claimed in claim 18, wherein the center pin assembly is insulated from electrode terminals, and, when pressure of a predetermined level or higher is applied from the outside, the at least two protrusions fracture the first separation film, the first electrode plate, and the second separation film so that the at least one short circuit is created intentionally.

20. The electrochemical device as claimed in claim 18, wherein the center pin assembly is made of an electrically conductive material and is electrically connected to the second electrode tab of the second electrode plate, the center pin assembly is insulated from the first electrode plate by the first separation film in a normal condition, and, when pressure of a predetermined level or high is applied from the outside, the at least two protrusions fracture the first separation film so that the at least one short circuit is created intentionally.

21. The electrochemical device as claimed in claim 18, wherein the substance capable of improving the safety of the device is a gas or a gas-creating compound, a safety means is provided inside the device so as to sense a change of pressure inside the device and deactivate the device or to turn an abnormal condition inside the device to a normal condition, and an amount of gas discharged from the container is determined in a range activating the safety means adapted to sense a change of pressure inside the device.

22. The electrochemical device as claimed in claim 21, wherein the safety means comprises at least one safety means selected from the group consisting of (i) a first safety means adapted to sense a change of pressure inside the device and stop the device from being charged or to switch a charging condition to a discharging condition; and (ii) a second safety means adapted to sense a change of pressure inside the device and emit heat or gas from inside the gas.

23. The electrochemical device as claimed in claim 22, wherein the first safety means comprises a pressure-sensitive device.

24. The electrochemical device as claimed in claim 22, wherein the first safety means comprises (i) a pressure-sensitive device; (ii) a wire for transmitting a current from the pressure-sensitive device; and (iii) a member adapted to respond to the current transmitted via the wire and stop the device from being charged or to switch the charging condition to the discharging condition.

25. The electrochemical device as claimed in claim 22, wherein the second safety means is a pressure-opened valve.

26. The electrochemical device as claimed in claim 22, wherein the first safety means, the second means, or both the first and second safety means are activated by volume expansion and pressure increase inside the device due to gas expulsion pressure occurring in the container in a temperature range above) a normal operation temperature of the device.

27. The electrochemical device as claimed in claim 18, which is a lithium secondary battery.

28. The center pin assembly as claimed in claim 8, wherein the temperature higher than the normal drive temperature ranges from 70° C. to 200° C.

29. The center pin assembly as claimed in claim 10, wherein the temperature higher than the normal drive temperature ranges from 70° C. to 200° C.

30. The center pin assembly as claimed in claim 7, wherein the polymer connecting the two or more hollow cylindrical tubes is at least one polymer selected from the group consisting of silicone resins, acrylic resins, urethane resins, epoxy resins, rubber, polyethylene, polypropylene, polybutene, polyacetaldehyde, polyformaldehyde, polypropylene oxide, polymethyl methacrylate, polyvinylidene chloride, polyvinyl fluoride and polyvinylidene fluoride.

31. The center pin assembly as claimed in claim 9, wherein the polymer member for sealing the openings is at least one polymer selected from the group consisting of silicone resins, acrylic resins, urethane resins, epoxy resins, rubber, polyethylene, polypropylene, polybutene, polyacetaldehyde, polyformaldehyde, polypropylene oxide, polymethyl methacrylate, polyvinylidene chloride, polyvinyl fluoride and polyvinylidene fluoride.

* * * * *

UNITED STATES PATENT AND TRADEMARK OFFICE
CERTIFICATE OF CORRECTION

PATENT NO. : 8,039,135 B2
APPLICATION NO. : 12/446627
DATED : October 18, 2011
INVENTOR(S) : Young-Sun Park et al.

It is certified that error appears in the above-identified patent and that said Letters Patent is hereby corrected as shown below:

Column 1, line 36, "Lithium" should read --lithium--.
Column 4, line 41, "prevent" should read --prevents--.
Column 4, line 51, "create" should read --creates--.
Column 5, line 8, "form" should read --from--.
Column 5, line 18, "contact" should read --contacting--.
Column 6, line 53, "expand" should read --expands--.
Column 6, line 54, "batter" should read --battery--.
Column 8, line 34, "$Al_2(OH)_3$" should read --$Al(OH)_3$--.
Column 11, line 45, "Long" should read --long--.
Column 11, line 63, "devices" should read --device--.
Column 12, line 3, "devices" should read --device--.
Column 12, line 25, "example" should read --examples--.
Column 14, line 62, "mg $(NO_3)_2$" should read --$Mg(NO_3)_2$--.
Column 14, lines 62-63, "$Al_2(OH)_3$" should read --$Al(OH)_3$--.
Column 16, line 21, delete the parenthesis ")" after "above".

Signed and Sealed this
Ninth Day of April, 2013

Teresa Stanek Rea
*Acting Director of the United States Patent and Trademark Office*